June 24, 1930.    F. G. ROSE    1,766,840
SWING SEATING DEVICE
Filed Aug. 27, 1928    3 Sheets-Sheet 1

INVENTOR:
Frank G. Rose,

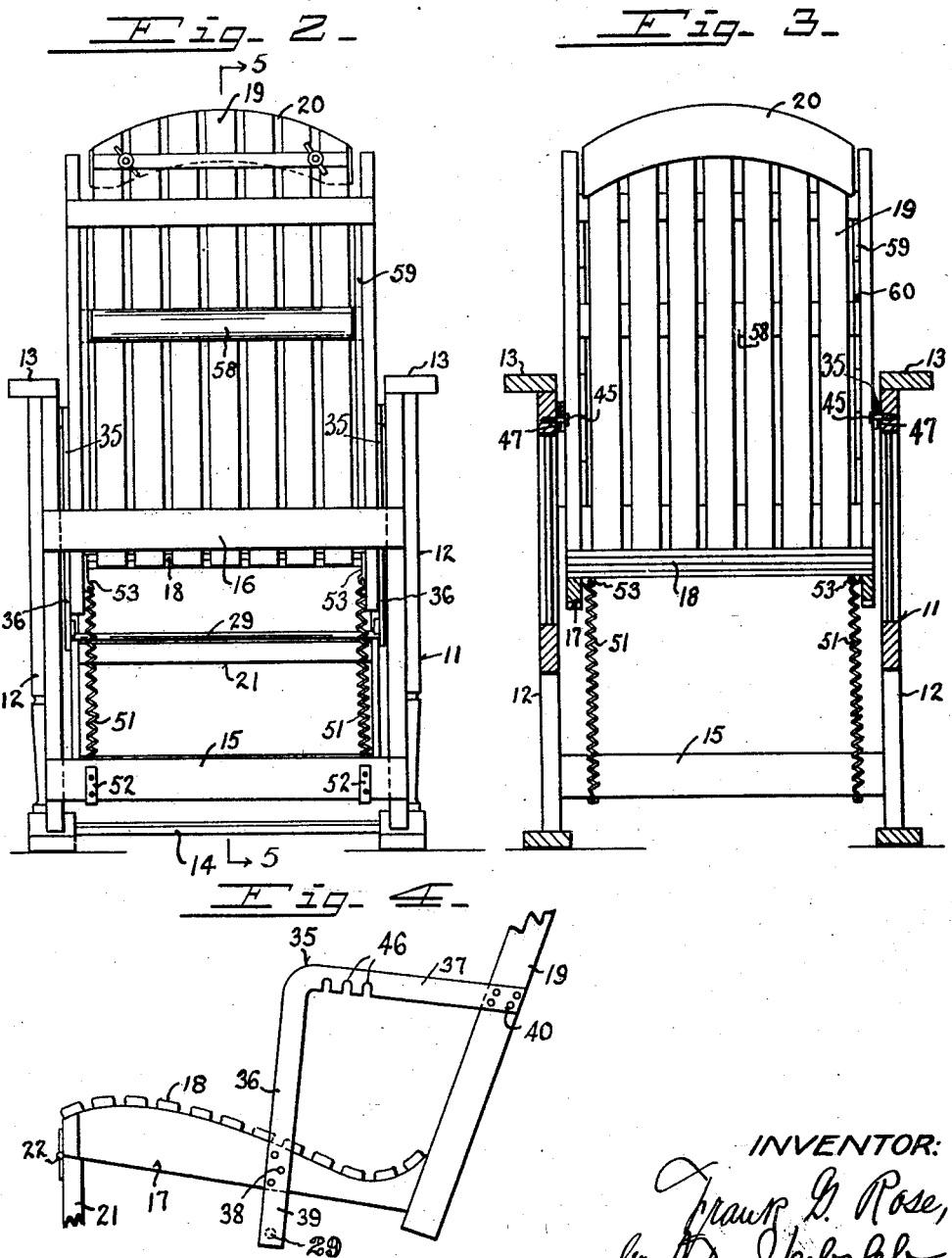

June 24, 1930.  F. G. ROSE  1,766,840
SWING SEATING DEVICE
Filed Aug. 27, 1928   3 Sheets-Sheet 3
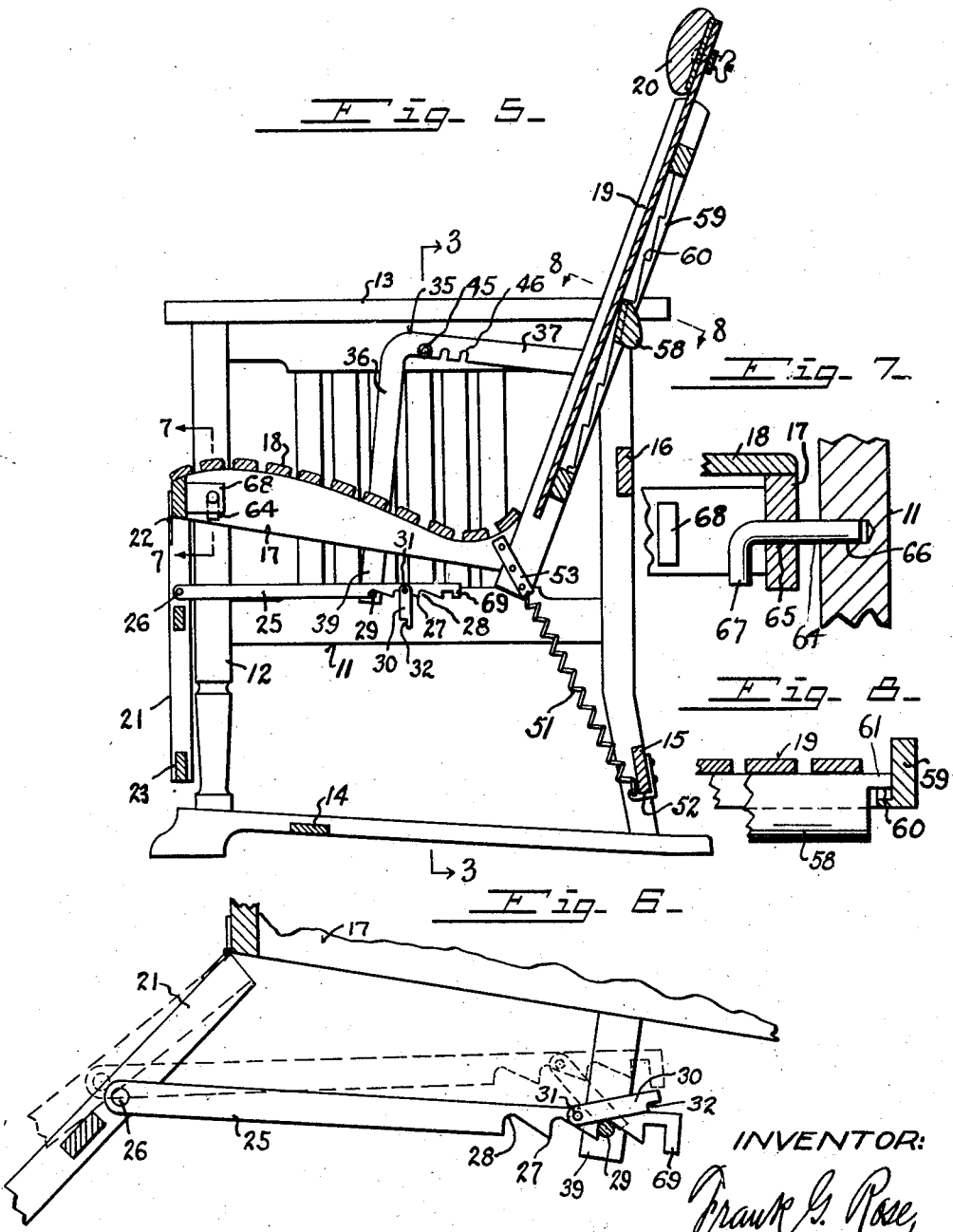

Patented June 24, 1930

1,766,840

UNITED STATES PATENT OFFICE

FRANK G. ROSE, OF DAYTON, KENTUCKY

SWING SEATING DEVICE

Application filed August 27, 1928. Serial No. 302,187.

My invention relates to swing seating devices, such as rocking chairs, porch and lawn swings, and the like.

It is the object of my invention to provide novel means for suspending the seat; further, to provide novel means for cushioning the swinging action of the seat; further, to provide novel means for qualifying the swinging and cushioning movements; further, to provide novel means for counterbalancing the seat; and, further, to provide novel means for adjusting the leg-rest related to said suspending means.

The invention will be further readily understood from the following description and claims, and from the drawings, in which latter:

Fig. 2 is a rear elevation of the same.

Fig. 3 is a vertical cross-section of the same, taken in the plane of the line 3—3 of Fig. 5.

Fig. 4 is a side view of the seat-frame, partly broken away.

Fig. 5 is a vertical longitudinal section of my improved device, taken on the line 5—5 of Fig. 2.

Fig. 6 is a detail, partly in section, showing the adjusting means for supporting the leg-rest in an adjusted position in full lines, and showing the relation of the parts when releasing the leg-rest in dotted lines.

Fig. 7 is a detail of the locking means for the seat-frame, shown in section on the line 7—7 of Fig. 5; and Fig. 8 is a detail of the counterbalance means for the seat-frame, shown in section on the line 8—8 of Fig. 5.

Figure 1:
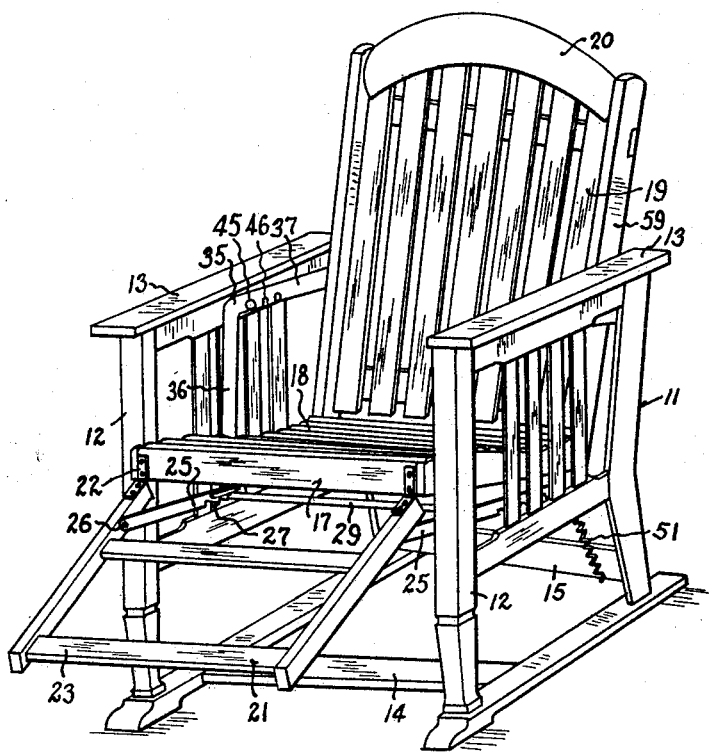
Fig. 1 is a perspective view of my improved device.

A main frame 11 comprises sides 12 provided with arm-rests 13 and connected by cross-pieces 14, 15 and 16, for forming a rigid structure.

A seat-frame 17 comprises a seat 18 and a back 19. There is an adjustable head-rest 20 at the upper portion of the back, which is adjustable up and down in suitable manner on the back. A leg-rest 21 is hinged by hinges 22 to the front part of the seat-frame and comprises a foot-bar 23. The leg-rest is adjustable by raising and lowering the same on its hinges.

A bar 25 is pivoted by a pivot 26 to the leg-rest. There is one of these bars at each side of the leg-rest. Each of the bars is provided with teeth 27 having recesses 28 therebetween coacting with a cross-rod 29. Each of the bars is provided with a releasing pawl 30, pivoted to the bar by a pivot 31. The releasing pawl is provided with a notch 32, the wall of which is arranged to coact with the cross-rod 29 for releasing the bar, and thereby releasing the leg-rest.

An angle-bar 35 at each side of the seat-frame comprises an upright portion 36 and a rearwardly extending portion 37. The lower part of the upright portion is fixed to the seat, as at 38, leaving a lower extension 39. The respective ends of the cross-rod 29 are secured to said lower extensions at the respective sides of the seat-frame. The rear part of the rearwardly extending portion of the angle-bar is fixed to the back, as at 40, at the respective sides of the seat-frame.

Pivoting means are provided between the main frame and the seat-frame, which pivoting means are preferably adjustable. These pivoting means are exemplified as a pivot-pin 45, secured to the main frame at each side of the latter in adjacency to the arm-rests 13. The angle-bar is provided with a recess 46 in the angle of said angle-bar. A plurality of these recesses are shown, spaced apart in the forward part of the rearwardly extending portion of the side angle-bar. These respective recesses at the respective sides of the seat-frame are arranged to be placed about the pivot-pins for positioning the seat-frame forwardly or rearwardly with relation to the main frame. Each of the pins is preferably provided with a washer 47, located between the angle-bar and the side member of the main frame, for permitting free swinging movement of the seat-frame without scraping the main frame.

A spring 51 extends between the rear lower portion of the main frame and the rear portion of the seat in the seat-frame. One of these springs is shown at each side of the frames. The spring is shown as a helical spring. Its lower end is shown secured to a clip 52 fixed to the cross-piece 15. The upper end of the spring is shown secured to a clip 53 secured to the side-bars 54 of the seat-frame in the angle between the seat and back.

This spring is shown as a helical spring with the axis extending in a straight line substantially parallel with the plane in which the securing point between the lower end of the spring and the rear lower portion of the main frame and the pivotal axis of the pivoting means for the seat-frame are located.

The spring resiliently holds the seat-frame in normal position, indicated in Fig. 5, and returns the seat-frame to such normal position when the seat-frame has been swung out of such normal position either manually or by an occupant of the seat.

Counterbalancing means are provided for the seat-frame, shown as a weight-bar 58. The side-bars 59 of the back are provided with teeth 60, arranged to selectively receive the reduced ends 61 of the weight-bar, the weight-bar being releasably held in selected positions, as by being squeezed between said teeth and the slats of the back of the seat-frame for urging the weight-bar into the recesses between the teeth. The weight-bar may be an adjustable metal cross-bar extending crosswise of the back of the seat.

A lock-pin 64 is arranged to reciprocate in a hole 65 in the seat-frame and to be received in a hole 66 in the main frame. The lock-pin is provided with a handle 67. A stop 68 on the seat-frame limits the releasing movement of the lock-pin. When the lock-pin is moved outwardly, it connects the seat-frame with the main frame to prevent swinging movement of the seat-frame. When the lock-pin is moved inwardly its handle strikes the stop 68 for releasing the seat-frame, permitting swinging movement of the seat-frame when the lock-pin is free of the main frame.

A person sitting in the seat-frame may easily impart swinging movements to the seat-frame. These swinging movements out of normal position of the seat-frame forwardly and back are cushioned by the spring, which aids in returning the seat-frame to and past normal position, due to momentum imparted to the seat-frame, the seat-frame being pivoted above the seat and forwardly of the back, and the arrangement permitting easy, ready and balanced swinging of the seat-frame.

The pivot means are preferably located rearwardly of the middle portion of the seat, and the pivot recesses are arranged on the rearwardly extending portion of the angle-bar in spaced-apart relation extending rearwardly. In the arrangement exemplified, the front pivot-recess is arranged to be normally received about the pivot-pin when persons of average weights are seated in the seat-frame. When heavier persons desire to employ the device, the seat-frame is preferably moved forwardly for causing the second recess or the third recess from the front to be received about the pivot-pin.

This adjustable positioning of the seat-frame aids in balancing the occupants of different weights in the seat-frame on the pivot means. The forward positioning of the seat-frame also causes a greater tensioning on the spring, by lengthening the spring, so that the resistance of the spring is increased, and tilts the seat-frame forwardly, when the seat is arranged for receiving heavier persons, for more nearly balancing such heavier persons. Heavier persons tend to tilt the seat-frame rearwardly to greater extent, which tendency is counteracted by the adjusted forward positioning of the seat-frame.

The position of the adjustable weight 58 qualifies the position of the seat-frame and tension upon the spring, and is especially useful when a light weight person or child is using the device. The adjustable weight is adjusted up or down on the back of the seat-frame for aiding in balancing the person in the chair. The lighter the person the more advisable it is to raise the counter-balance weight.

The leg-rest is arranged to be swung forwardly when the device is in use, which may be readily done by arranging the heel of the user in rear of the lower foot-bar 23 of the leg-rest for raising the leg-rest. When the leg-rest is raised, the bar 25 moves forwardly for causing coaction of any desirable one of the tooth-recesses 28 between the teeth 27 on the bar 25 with the cross-rod 29.

If it is desired to return the leg-rest to normal position, the leg-rest is first brought upwardly to its limit, which causes the releasing pawl 30 to be swung rearwardly by the cross-rod for receiving the cross-rod in the end notch 32 in the releasing pawl and in the rear recess 28 of the bar 25. A stop 69 on the bar 25 limits the forward swinging movement of the leg-rest.

When now weight is applied to the leg-rest, the releasing pawl is caused to tilt on its pivot for raising the rear end of the bar 25 and raising the teeth thereon away from the cross-rod 29, as shown in dotted lines in Fig. 6, throughout the range of said teeth. for permitting free rearward movement of said bar 25, and complete lowering of the leg-rest.

Having thus fully described my invention, what I claim as new, and desire to secure by Letters Patent, is:

1. In a swing seating device of the character described, the combination of a main frame, a seat-frame in said main frame, said seat-frame provided with a seat and a back, an angle-bar provided with an upright portion and a rearwardly extending portion, the lower part of said upright portion secured to said seat and the rear part of said rearwardly extending portion secured to said back, pivot means between said main frame and said angle-bar adjacent to the angle of said angle-bar, and a helical spring the respective ends whereof are respectively secured to the rear lower portion of said main frame and to said seat-frame at the rear portion of said seat, the axis of said spring extending in a line substantially parallel with the plane in which the point of attachment of the lower end of said spring to said main frame and the pivotal axis of said pivot means are located.

2. In a swing seating device of the character described, the combination of a main frame, a seat-frame in said main frame, said seat-frame provided with a seat and a back, an angle-bar provided with an upright portion and a rearwardly extending portion, the lower part of said upright portion secured to said seat and the rear part of said rearwardly extending portion secured to said back, pivot means between said main frame and said angle-bar adjacent to the angle of said angle-bar, a helical spring the respective ends whereof are respectively secured to the rear lower portion of said main frame and to said seat-frame at the rear portion of said seat, the axis of said spring extending in a line substantially parallel with the plane in which the point of attachment of the lower end of said spring to said main frame and the pivotal axis of said pivot means are located, a counterbalance weight, and means for elevationally adjusting said counterbalance weight on said back.

3. In a swing seating device of the character described, the combination of a main frame, a seat-frame in said main frame, said seat-frame provided with a seat and a back, an angle-bar provided with an upright portion and a rearwardly extending portion, the lower part of said upright portion secured to said seat and the rear part of said rearwardly extending portion secured to said back, a pivot-pin on said main frame above said seat and forwardly of said back, said rearwardly extending portion of said angle-bar provided with a plurality of pivot-recesses adjacent to the angle of said angle-bar, said pivot-recesses arranged to be selectively received about said pivot-pin for changing the balancing effect of said seat-frame, a helical spring, securing means between the lower end of said helical spring and the lower rear portion of said main frame, and securing means between the upper end of said helical spring and said seat-frame proximate to the rear portion of said seat, the axis of said spring extending in a line substantially parallel with the plane in which said first-named securing means and said pivot-pin are located.

4. In a swing seating device of the character described, the combination of a main frame, a seat-frame in said main frame, said seat-frame provided with a seat and a back, an angle-bar provided with an upright portion and a rearwardly extending portion, the lower part of said upright portion secured to said seat and the rear part of said rearwardly extending portion secured to said back, a pivot-pin on said main frame above said seat and forwardly of said back, said rearwardly extending portion of said angle-bar provided with a plurality of pivot-recesses adjacent to the angle of said angle-bar, said pivot-recesses arranged to be selectively received about said pivot-pin for changing the balancing effect of said seat-frame, a helical spring, securing means between the lower end of said helical spring and the lower rear portion of said main frame, securing means between the upper end of said helical spring and said seat-frame proximate to the rear portion of said seat, the axis of said spring extending in a line substantially parallel with the plane in which said first-named securing means and said pivot-pin are located, a counterbalance weight, and means for elevationally adjusting said counterbalance weight on said back.

5. In a swing seating device of the character described, the combination of a main frame, a seat-frame in said main frame, said seat-frame provided with a seat and a back, an angle-bar provided with an upright portion and a rearwardly extending portion, the lower part of said upright portion secured to said seat and the rear part of said rearwardly extending portion secured to said back, pivot means between said main frame and said angle-bar adjacent to the angle of said angle-bar, a helical spring the respective ends whereof are respectively secured to the rear lower portion of said main frame and to said seat-frame proximate to the rear portion of said seat, the axis of said spring extending in a line substantially parallel with the plane in which the point of attachment of the lower end of said spring to said main frame and the pivotal axis of said pivot means are located, a leg-rest hinged to the forward end of said seat-frame, an adjusting bar for said leg-rest, and adjustable connecting means between the rear end of said adjusting bar and the lower end of said upright portion of said angle-bar.

In testimony whereof, I have hereunto signed my name.

FRANK G. ROSE.